US012593936B2

(12) United States Patent
Peng

(10) Patent No.: US 12,593,936 B2
(45) Date of Patent: Apr. 7, 2026

(54) MULTIFUNCTIONAL MICROWAVE BAKING TRAY

(71) Applicant: Huamin Peng, Foshan (CN)

(72) Inventor: Huamin Peng, Foshan (CN)

( * ) Notice: Subject to any disclaimer, the term of this patent is extended or adjusted under 35 U.S.C. 154(b) by 0 days.

(21) Appl. No.: 19/032,185

(22) Filed: Jan. 20, 2025

(65) Prior Publication Data

US 2026/0007272 A1 Jan. 8, 2026

(30) Foreign Application Priority Data

Jun. 28, 2024 (CN) .......................... 202421513261.9

(51) Int. Cl.
| | |
|---|---|
| *A47J 36/02* | (2006.01) |
| *A47J 27/13* | (2006.01) |
| *A47J 36/06* | (2006.01) |
| *A47J 36/20* | (2006.01) |

(52) U.S. Cl.
CPC ............. *A47J 36/027* (2013.01); *A47J 27/13* (2013.01); *A47J 36/06* (2013.01); *A47J 36/20* (2013.01)

(58) Field of Classification Search
CPC ......... A47J 36/027; A47J 27/13; A47J 36/06; A47J 36/20
USPC ....... 219/725, 730, 731, 732, 733, 734, 735; 426/118, 241, 243; 99/DIG. 14, 410
See application file for complete search history.

(56) References Cited

U.S. PATENT DOCUMENTS 4,477,705 A * 10/1984 Danley .............. B65D 81/3453
426/243

FOREIGN PATENT DOCUMENTS

| CN | 207378890 U | 5/2018 |
|---|---|---|
| CN | 208703971 U | * 4/2019 |

OTHER PUBLICATIONS

Translation of CN208703971, "Microwave Oven Baking Pan", Apr. 5, 2019, By Espacenet (Year: 2019).*

* cited by examiner

*Primary Examiner* — Quang T Van
(74) *Attorney, Agent, or Firm* — Birchwood IP

(57) ABSTRACT

A multifunctional microwave baking tray includes a tray body, an upper cover and a microwave absorbing layer; an outer edge of the upper cover is wrapped with a protective casing, and has an axisymmetric outline having at least two symmetric axes; first protrusions are arranged on a side wall of an inner chamber of the tray body; the outer edge of the upper cover is provided with grooves matched with the first protrusions; when the grooves are aligned with the first protrusions, the grooves move over the first protrusions to enable the upper cover to freely enter the inner chamber of the tray body; when the grooves are staggered with the first protrusions, the upper cover is positioned above or below the first protrusions and cannot freely ascend and descend in the inner chamber of the tray body.

13 Claims, 13 Drawing Sheets

A-A

2

8

4

1

B−B

MULTIFUNCTIONAL MICROWAVE BAKING TRAY

CROSS-REFERENCE TO RELATED APPLICATIONS

This application claims priority to Chinese Patent Application No. 202421513261.9, filed on Jun. 28, 2024, which is hereby incorporated by reference in its entirety.

TECHNICAL FIELD

The present invention relates to the technical field of microwave cookers, and specifically relates to a multifunctional microwave baking tray.

BACKGROUND

As a safe and efficient cooking stove, microwave ovens have been widely used. Disclosed in CN201721456223.4 is a multifunctional microwave baking tray for a microwave oven, and the multifunctional microwave baking tray includes an upper cover, and a pot body; outer surfaces of the upper cover and the pot body are provided with microwave absorption layers, and the microwave absorption layers are used for absorbing the electromagnetic waves emitted by the microwave oven and converting the electromagnetic waves into heat; the pot body includes a metal base plate and a side wall; the section of a lower part of an inner chamber of the pot body has an outline adapted to that of an outer edge of the upper cover, and the outer edge of the upper cover has a rectangular or approximately rectangular outline; a first side of the outer edge of the upper cover is longer than a second side; the section of an upper part of the inner chamber of the pot gradually increases in the direction of an opening; the upper end of the side wall of the pot body is provided with a side edge; and the second side of the outer edge of the upper cover can be supported on the long side of the side edge of the pot body. In the technical solution, the section of the lower part of the inner chamber of the pot body has the outline adapted to the outer edge of the upper cover and has the rectangular or approximately rectangular outline, the long side coincides with the upper cover and can extend into the inner chamber of the pot body, and the long side and the short side coincide with the upper cover and cover the opening of the inner chamber of the pot body, so that different length of the inner chamber of the pot body is realized. However, the rectangular or approximately rectangular shape limits the shape of the baking tray, and when the long side and the short side coincide and the upper cover is placed, the upper cover and the pot body fail to fully match, so the stability is poor, and a gap between the upper cover and the pot body is large, which affects the food baking effect.

SUMMARY

An objective of the present invention provides a multifunctional microwave baking tray, which solves the problems that a rectangular or approximately rectangular shape limits the shape of the baking tray, and when a long side and a short side coincide and an upper cover is placed, the upper cover and a pot body fail to fully match, so the stability is poor, and a gap between the upper cover and the pot body is large, which affects the food baking effect, so as to overcome the defects in related technology.

According to a technical solution of the present invention, a multifunctional microwave baking tray includes a tray body, an upper cover and microwave absorbing layers; an outer edge of the upper cover is wrapped with a protective casing; the outer edge of the upper cover has an axisymmetric outline having at least two symmetric axes; first protrusions are arranged on a side wall of an inner chamber of the tray body; the outer edge of the upper cover is provided with grooves matched with the first protrusions; when the grooves are aligned with the first protrusions, the grooves move over the first protrusions to enable the upper cover to freely enter the inner chamber of the tray body; and when the grooves are staggered with the first protrusions, the upper cover is positioned above or below the first protrusions and cannot freely ascend and descend in the inner chamber of the tray body.

A second protrusion is arranged at a bottom part of the side wall of the inner chamber of the tray body and is not matched with the grooves.

The inner chamber of the tray body is round, and third protrusions are arranged on the side wall of the inner chamber of the tray body between the first protrusions and the second protrusion.

The first protrusions and the third protrusions are bumps, and the second protrusion is at least one of a step and a bump.

The multifunctional microwave baking tray further includes an outer cover; the outer edge of the outer cover is provided with a cover edge; and a top end of the side wall of the tray body extends outwards to form a pot edge, and an insulation protection ring is arranged between the cover edge and the pot edge and located on the pot edge and/or the cover edge.

The tray body, the upper cover and the outer cover are all made of metal materials.

Outer surfaces of the tray body and the upper cover are provided with the microwave absorption layers.

The present invention has the following beneficial effects: the section of the inner chamber of the tray body and the outer edge of the matched upper cover are in a round shape or regular polygon shape, the outer edge of the upper cover is provided with the grooves corresponding to the first protrusions on the side wall of the tray body, the grooves and the first protrusions are aligned or staggered to place the upper cover in the inner chamber of the tray body at different depths, thus forming baking spaces of different sizes; and the upper cover and the inner chamber are fully matched all the time, so the covering stability is ensured, the gap is small, and thereby the food baking effect is improved.

3

Figure 1:
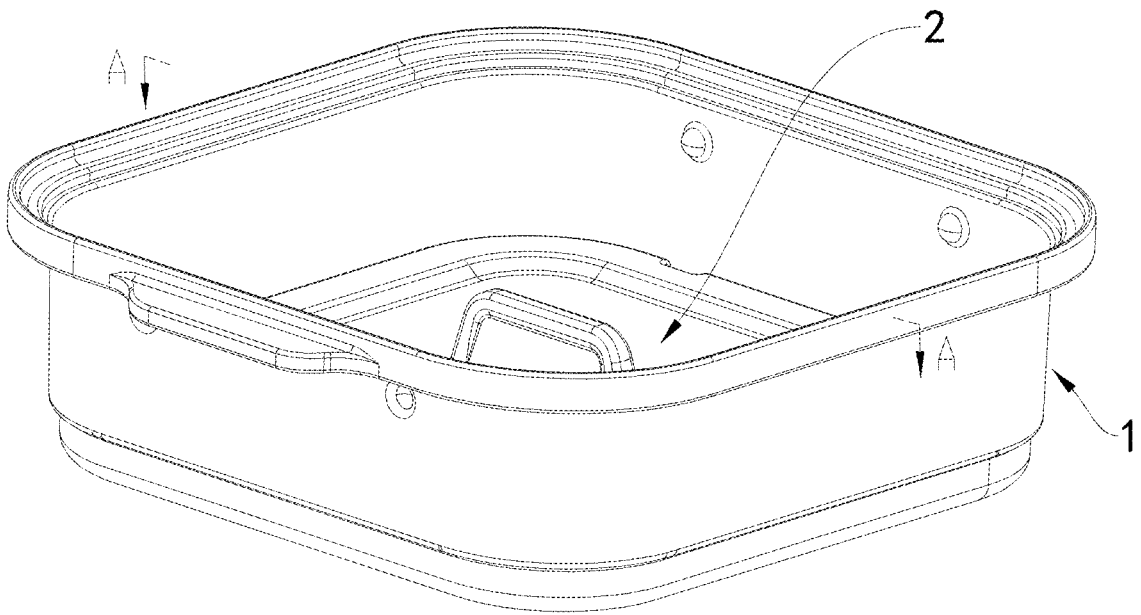
FIG. 1 is a three-dimensional schematic diagram of placing an upper cover at a bottom part of an inner chamber of a tray body according to an Embodiment 1 of the present invention.
Figure 2:
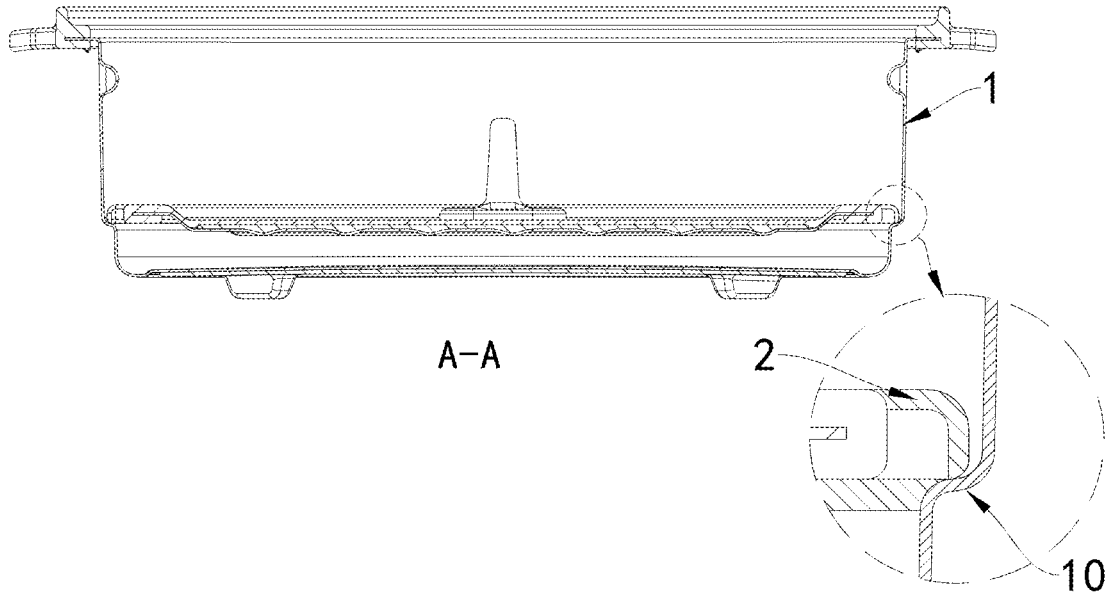
FIG. 2 is a cross-sectional view in an A-A direction in FIG. 1.
Figure 3:
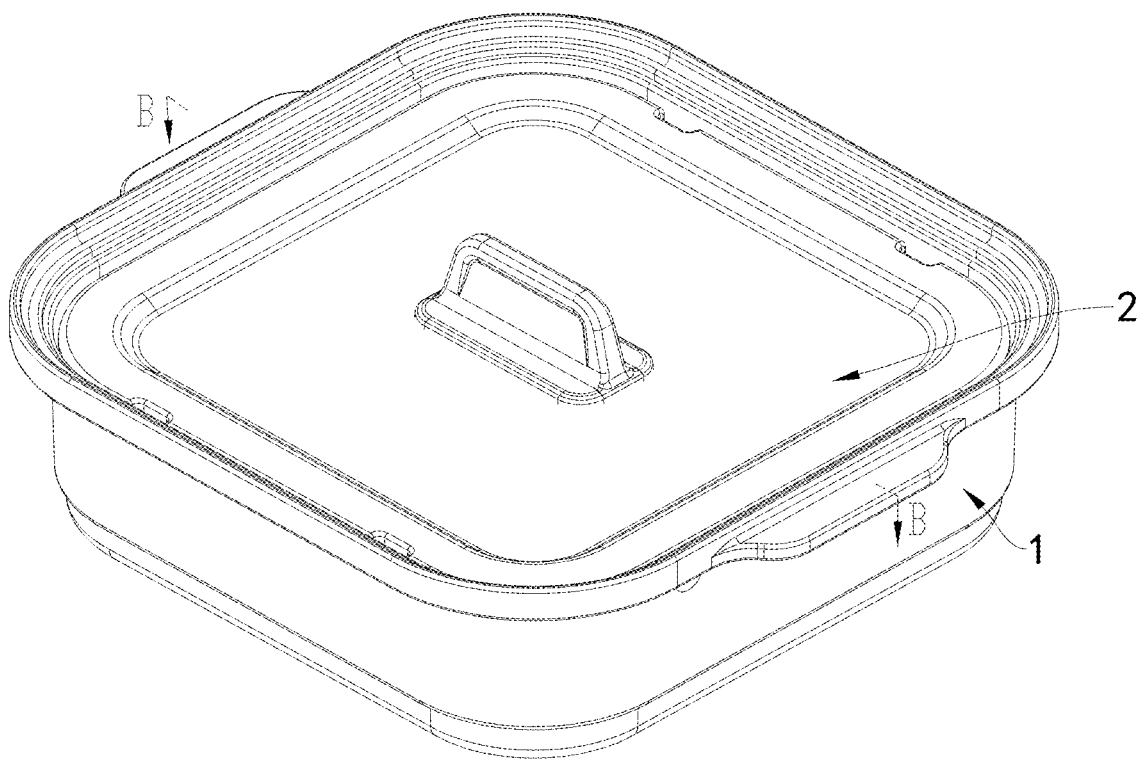
FIG. 3 is a three-dimensional schematic diagram of covering an upper cover on a tray body according to an Embodiment 1.
Figure 4:
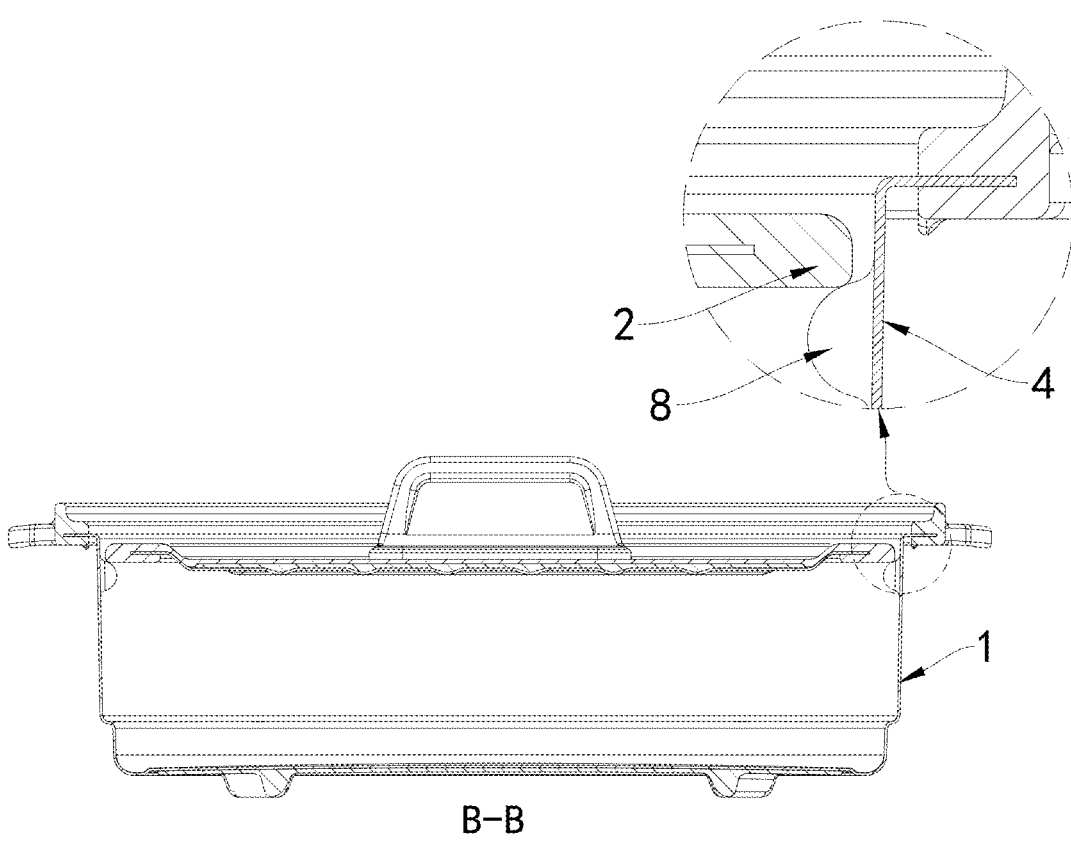
FIG. 4 is a cross-sectional view in a B-B direction in FIG. 3.
Figure 5:
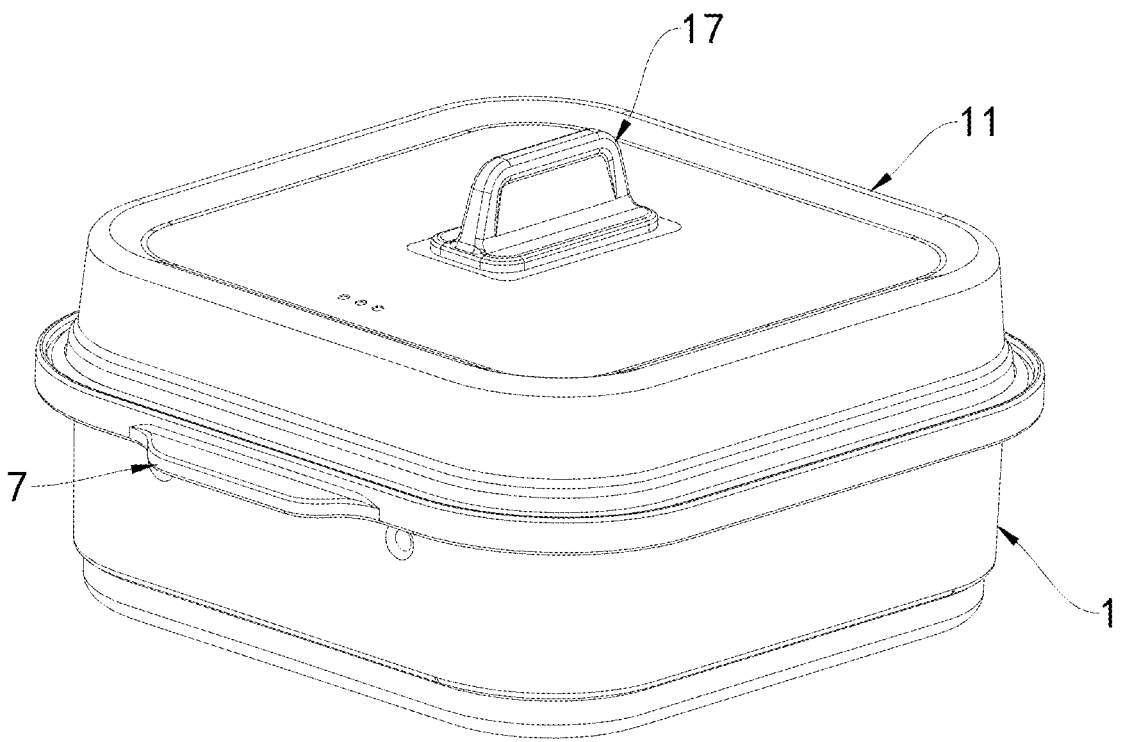
FIG. 5 is a three-dimensional schematic diagram of covering an outer cover on a tray body according to an Embodiment 1.
Figure 6:
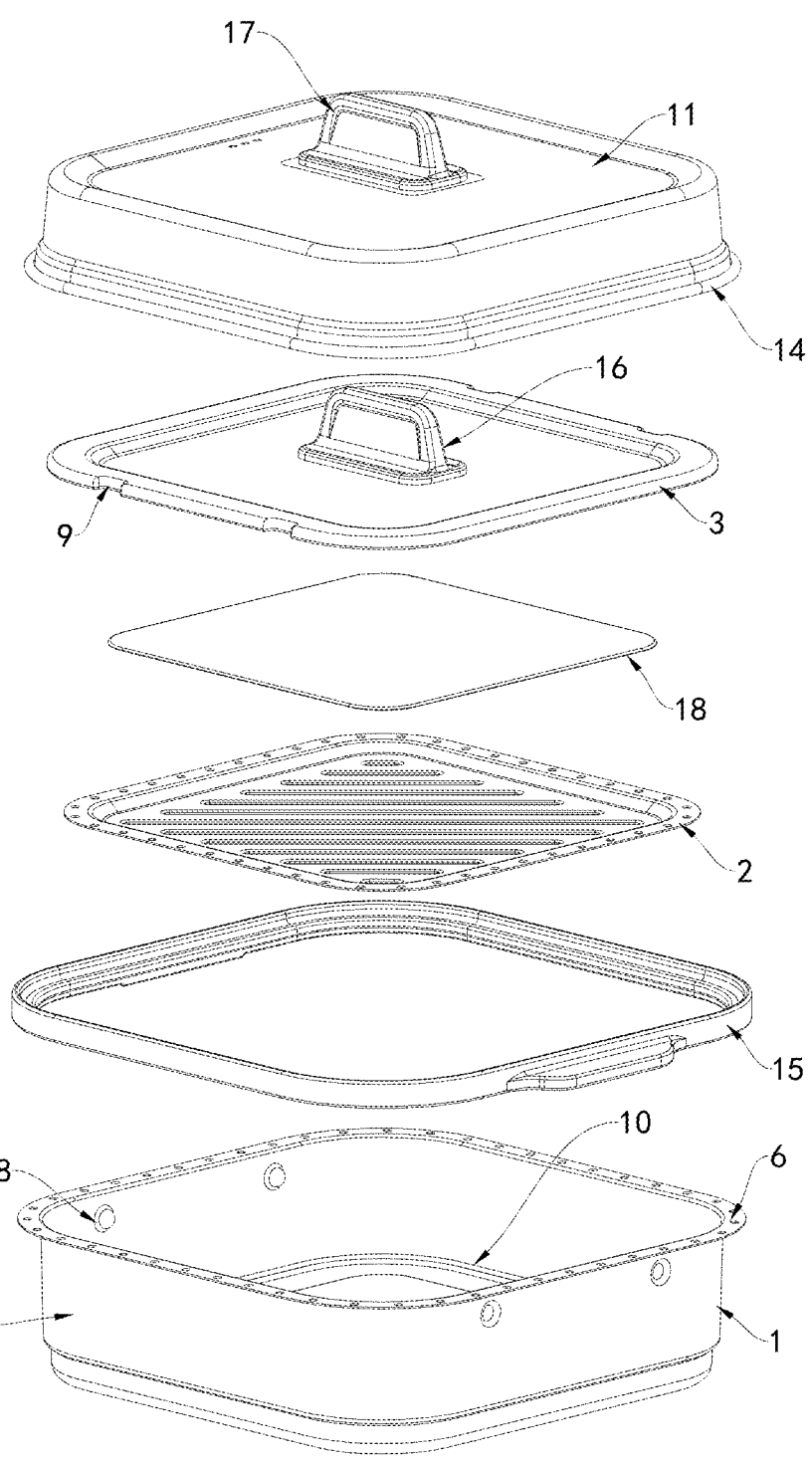

FIG. 6 is an exploded schematic diagram of an Embodiment 1.

Figure 7:
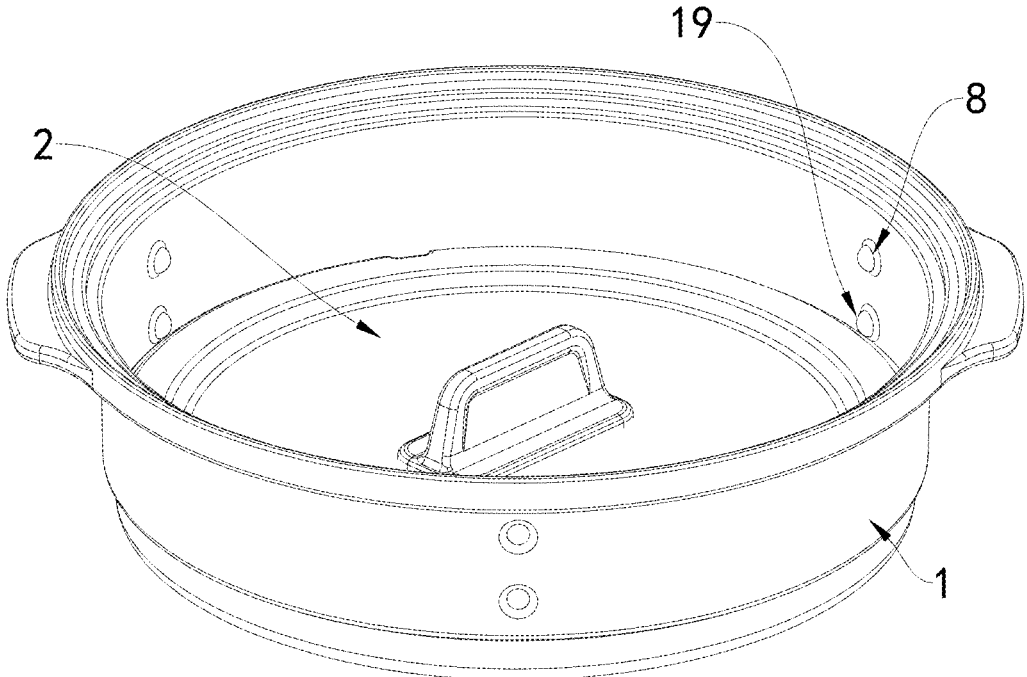

FIG. 7 is a three-dimensional schematic diagram of placing an upper cover at a bottom part of an inner chamber of a tray body according to an Embodiment 2.

Figure 8:
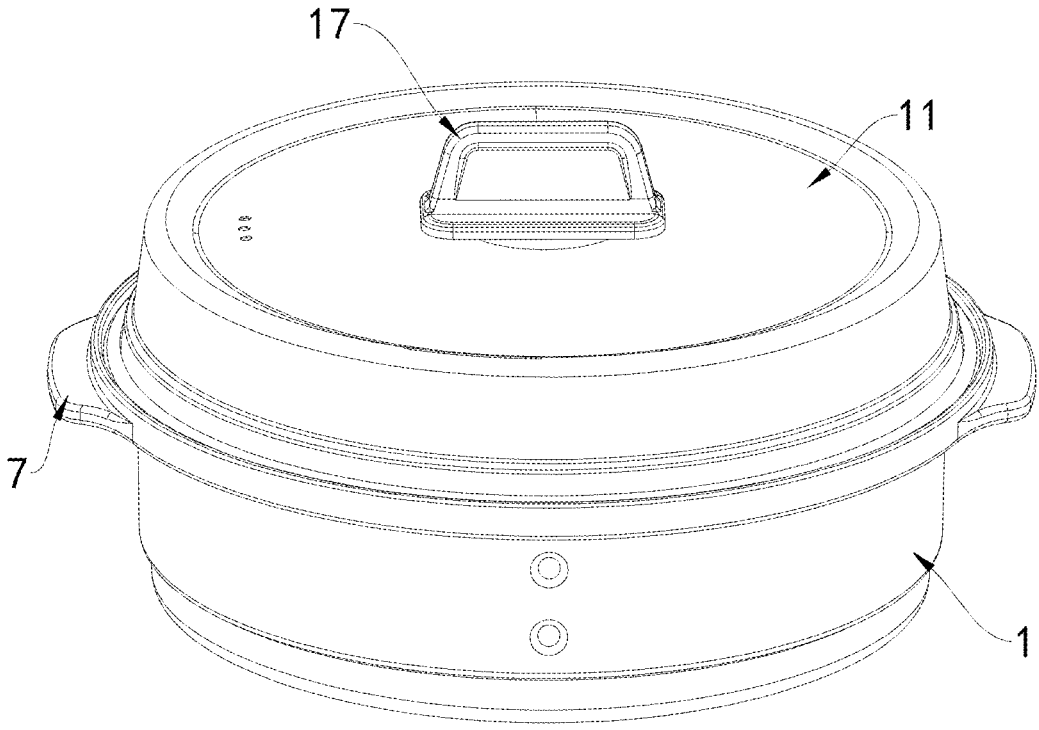

FIG. 8 is a three-dimensional schematic diagram of covering an outer cover on a tray body according to an Embodiment 2.

Figure 9:
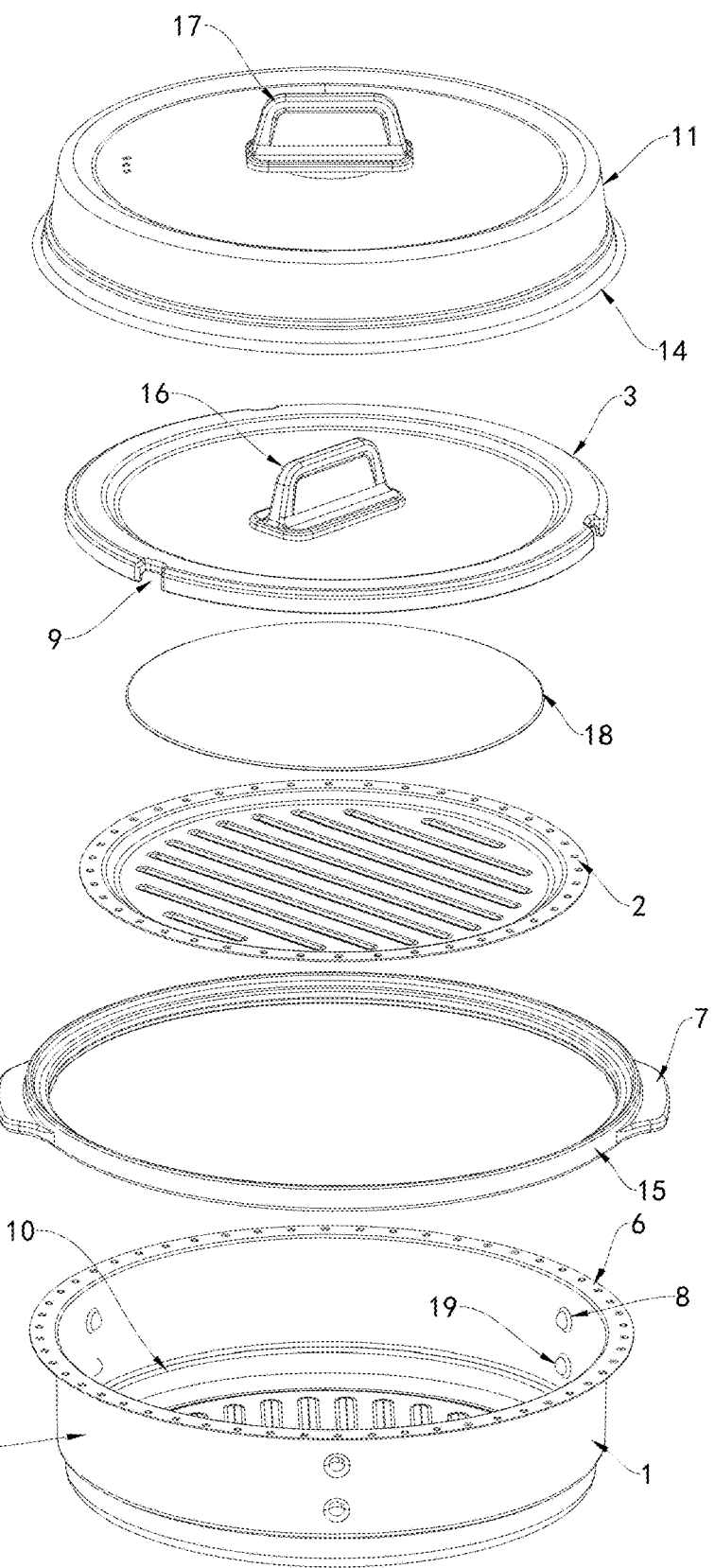

FIG. 9 is an exploded schematic diagram according to an Embodiment 2.

Figure 10:
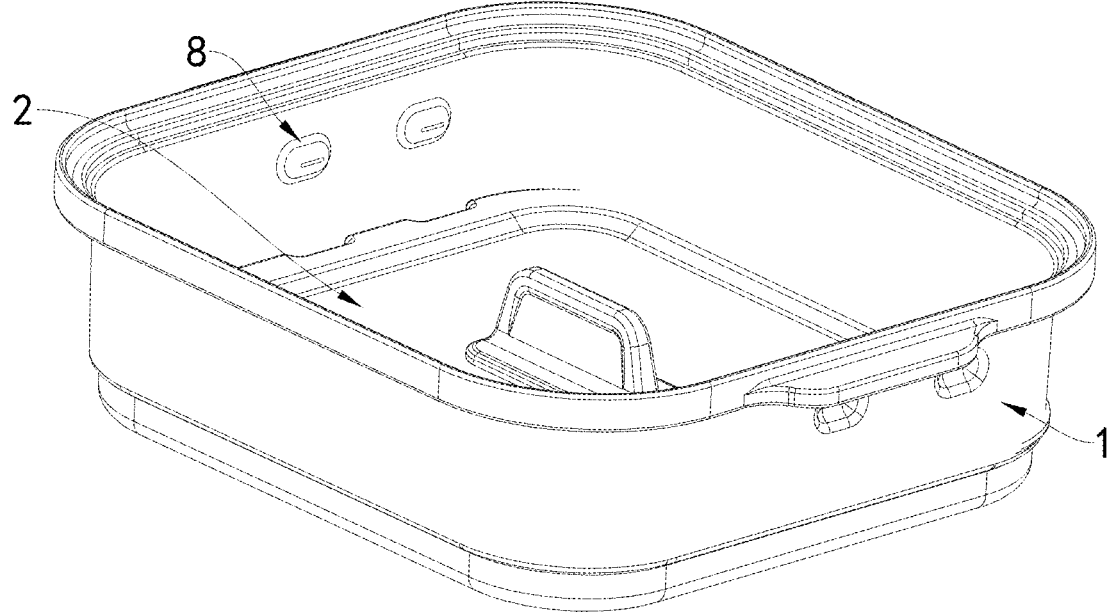

FIG. 10 is a three-dimensional schematic diagram of placing an upper cover at a bottom part of an inner chamber of a tray body according to an Embodiment 3.

Figure 11:
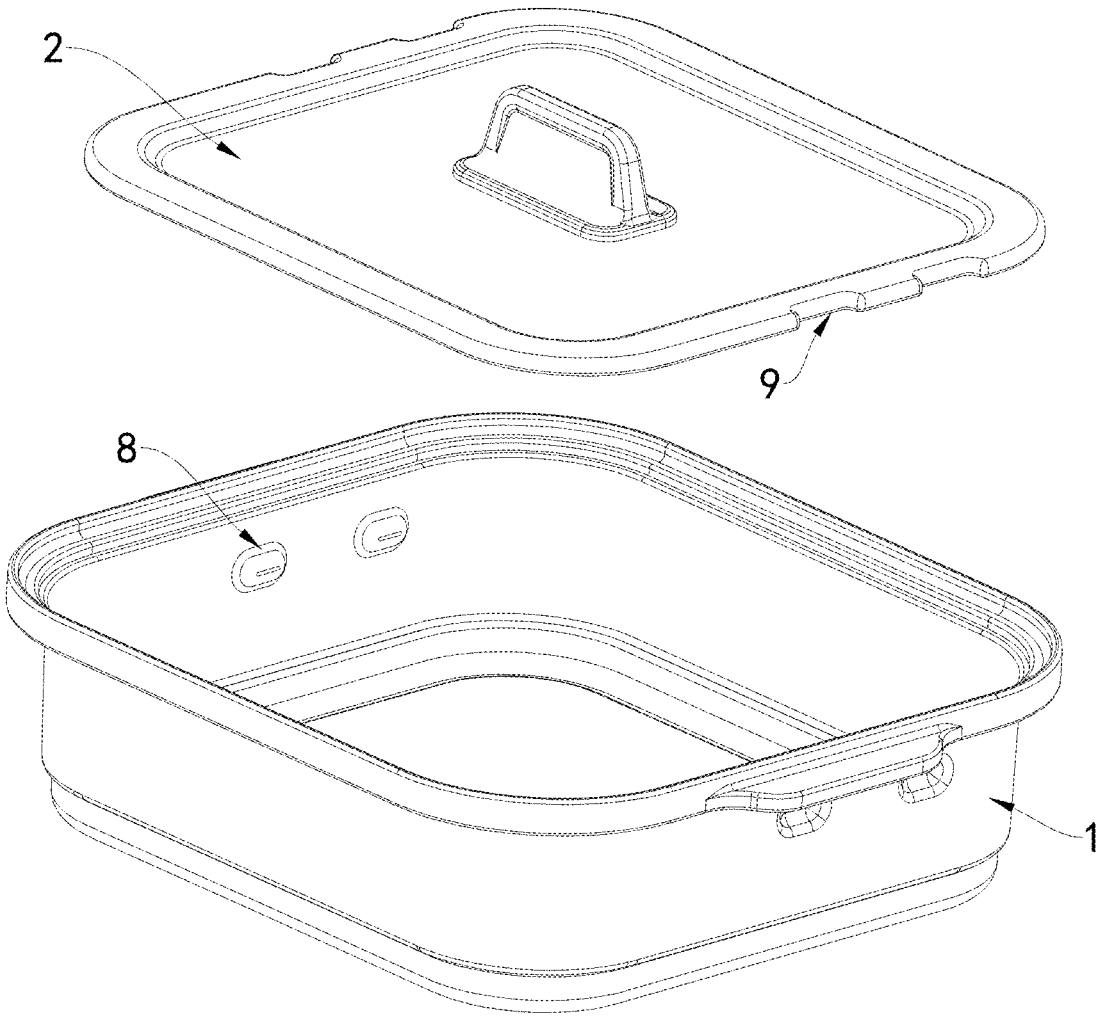

FIG. 11 is a schematic diagram of an upper cover and a tray body according to an Embodiment 3.

Figure 12:
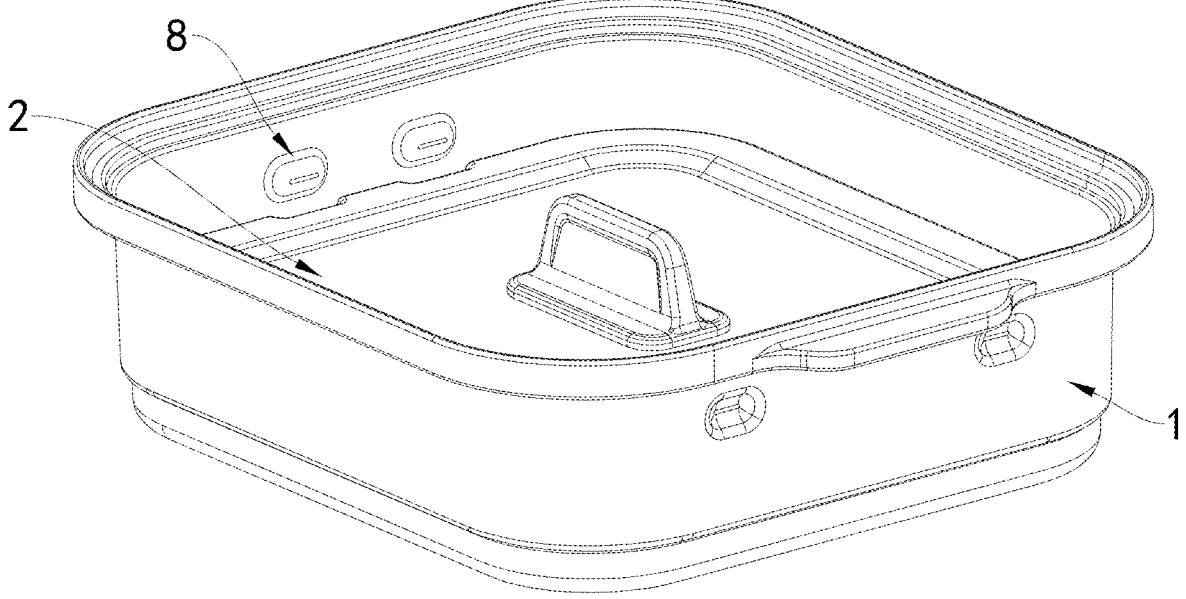

FIG. 12 is a three-dimensional schematic diagram of placing an upper cover at a bottom part of an inner chamber of a tray body according to an Embodiment 3.

Figure 13:
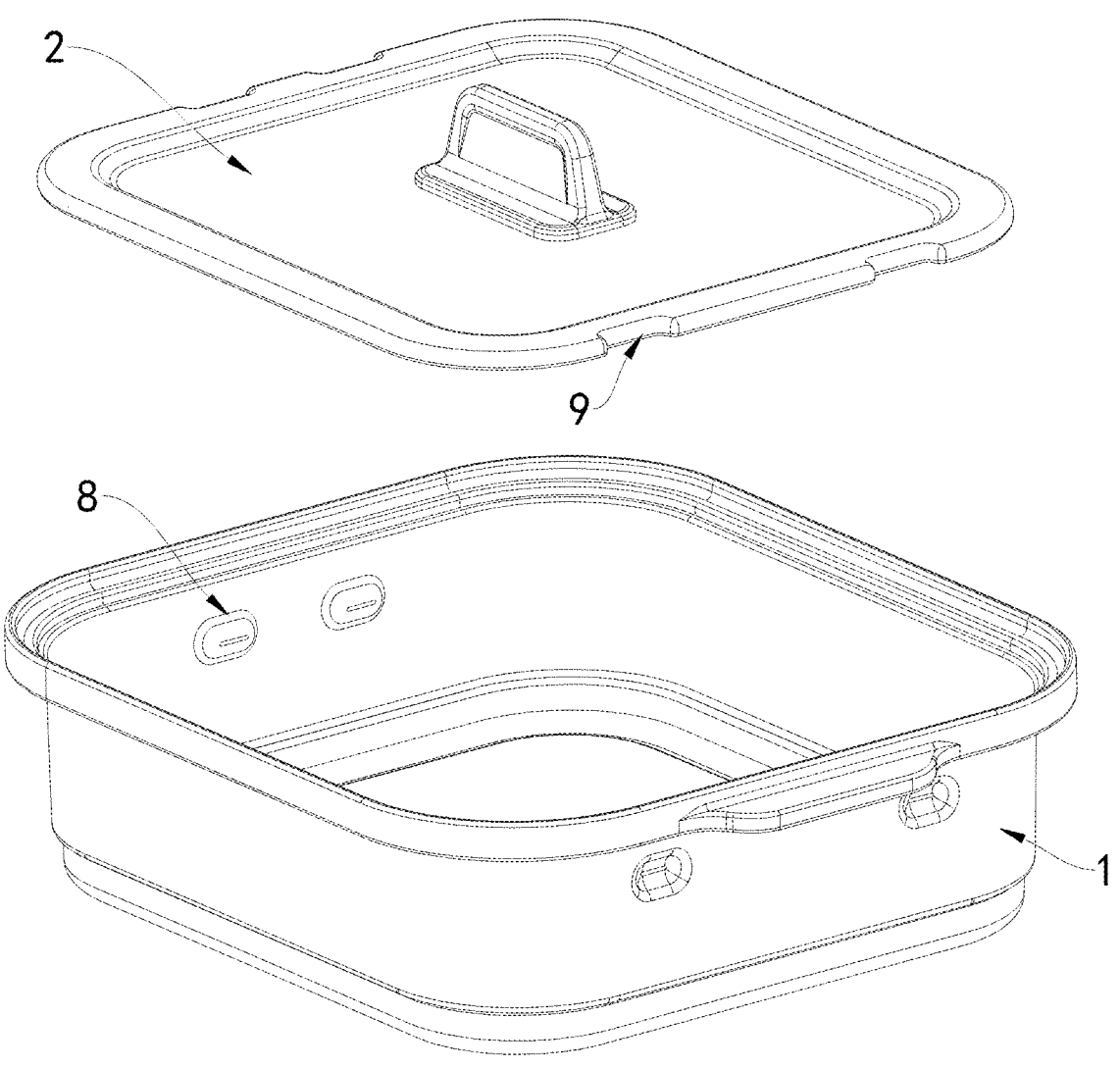

FIG. 13 is a schematic diagram of an upper cover and a tray body according to an Embodiment 4.

DESCRIPTION OF EMBODIMENTS

The technical solution of the present application is clearly and completely described below in conjunction with the accompanying drawings, and all other embodiments obtained by those of ordinary skill in the art without creative labor are within the scope of protection of the present application based on the embodiments in the present application.

As shown in FIG. 1 to FIG. 13, a multifunctional microwave baking tray includes a tray body 1 and an upper cover 2; the tray body 1 is used for placing food to be baked and heated; and a top end of a side wall 4 of the tray body extends outwards to form a pot edge 6.

An outer edge of the upper cover 2 is a protective casing 3 which wraps the upper cover 2, and the outer edge of the upper cover 2 has an outline matched with that of the section of an inner chamber of the tray body 1; and first protrusions 8 are arranged on a side wall of the inner chamber of the tray body 1, and the outer edge of the upper cover 2 is provided with grooves 9 corresponding to the first protrusions 8. The outer edge of the upper cover 2 has an axisymmetric outline having at least 2 symmetry axes, such as a round and a regular polygon; and the section of the inner chamber of the tray body 1 has the same outline as the outer edge of the matched upper cover 2 in shape.

Therefore, when the grooves 9 of the upper cover 2 are aligned to the first protrusions 8, the upper cover 2 can enter the inner chamber of the tray body 1 through the first protrusions 8 and move up and down in the inner chamber of the tray body 1; when the upper cover 2 moves downwards to the bottom part of the inner chamber of the tray body 1, a formed baking space is small and suitable for heating and baking of small foods; and the upper cover 2 can be rotated in a horizontal direction to stagger the grooves 9 of the upper cover 2 with the first protrusions 8, and at the moment, the upper cover 2 is directly placed on the first protrusions 8 and cannot enter the inner chamber of the tray body 1, and a formed baking space is large and suitable for heating and baking of big foods.

A second protrusion 10 is arranged at the bottom part of the inner chamber of the tray body 1; when the upper cover 2 moves to the bottom part of the inner chamber of the tray body 1, the upper cover 2 is placed on the second protrusion 10 to form a minimum space for baking, and therefore a situation that the upper cover 2 is in direct contact with the bottom part of the inner chamber of the tray body 1 and thereby dry burning at high temperature damages the microwave baking tray can be avoided.

The outer edge of the upper cover 2 and the section of the inner chamber of the tray body 1 have one of axisymmetric outlines having at least two symmetry axes, such as a round and a regular polygon, so the upper cover 2 and the inner chamber of the tray body 1 have at least two phases which keep the same matching effect; in one phase, the grooves 9 are aligned with the first protrusions 8, and thus the upper cover 2 can enter the inner chamber of the tray body 1 to realize covering; when the upper cover 2 is horizontally rotated to the other phase, the grooves 9 are staggered with the first protrusions 8, the upper cover 2 is placed on the first protrusions 8, and the upper cover 2 is always well matched with the inner chamber of the tray body 1 and keeps a small gap with the inner chamber of the tray body 1, so that heat loss during baking and heating can be avoided.

Outer surfaces of the tray body 1 and the upper cover 2 are provided with microwave absorption layers 18, thus foods in the inner chamber of the tray body 1 can be synchronously heated in an upper direction and a lower direction, which achieves effect equivalent to that under open fire or electric heating and baking.

According to the technical solution, the microwave baking tray further includes an outer cover 11; the outer edge of the outer cover 11 is provided with a cover edge 14, and the cover edge 14 is attached to the pot edge 6. The outer cover 11 is different from the upper cover 2 and does not need to be attached to foods to be baked; and when the microwave baking tray is used for steaming or heating, the outer cover 11 is mainly used for heat collection and heat preservation.

First handles 7 are arranged on two sides of the tray body 1, a second handle 16 is arranged on the upper surface of the upper cover 2, and a third handle 17 is arranged on the upper surface of the outer cover 11, which facilitates holding.

In an Embodiment 1, the section of the inner chamber of the tray body 1 and the outer edge of the matched upper cover 2 have quadrate outline.

In an Embodiment 2, the section of the inner chamber of the tray body 1 and the outer edge of the matched upper cover 2 have round outline; meanwhile, the upper cover 2 can move up and down and can also rotate horizontally after entering the inner chamber of the tray body 1; the side wall of the inner chamber of the tray body 1 between the first protrusions 8 and the second protrusion 10 is also provided with third protrusions 19, and a plurality of third protrusions 19 are provided and are distributed from top to bottom; after moving over the first protrusions 8, the upper cover 2 can continue to move over the third protrusions 19 below the upper cover 2 until reaching the second protrusion 10, or the upper cover 2 can also be rotated to stagger the grooves 9 with the third protrusions 19 so that the upper cover 2 can be placed on the third protrusions 19. Thus, the upper cover 2 is matched with the first protrusions 8, the third protrusions 19 and the second protrusion 10 to form a plurality of baking spaces of different sizes, and thereby meeting the baking requirements of different kinds of foods. In addition, some foods may expand after being baked, and the upper cover 2 will be jacked up from the placed third protrusions 19 by the expanded food till the upper cover 2 is stopped by the adjacent third protrusions 19 or the first protrusions 8 above the upper cover 2; the upper cover 2 is located between every two vertically adjacent third protrusions 19, or between the first protrusions 8 and the third protrusions 19, and the upper cover 2 can move properly according to the appearance change in the food baking process, thus keeping full contact with the foods in the baking process, and improving the baking effect.

Besides the common regular polygon shape, an arc-shaped regular polygon shape and a regular star polygon shape can also be adopted.

In addition, in an Embodiment 3 and an Embodiment 4, the section of the inner chamber of the tray body 1 and the outer edge of the matched upper cover 2 have rectangular outline.

In the Embodiment 3, as shown in FIG. 10 to FIG. 11, the first protrusions 8 are symmetrically arranged on two short sides of the inner chamber of the rectangular tray body 1 through a short symmetry axis of the rectangular tray body 1, and central positions of the first protrusions 8 deviate relative to a long symmetry axis of the inner chamber of the rectangular tray body 1, so that after the upper cover 2 is horizontally rotated by 180°, the grooves 9 of the upper cover 2 are staggered with the first protrusions 8, and then the upper cover 2 can be placed on the first protrusions 8.

In the Embodiment 4, as shown in FIG. 12 to FIG. 13, two first protrusions 8 are arranged on the short sides of two sides of the inner chamber of the rectangular tray body 1 respectively, the four first protrusions 8 are on the same horizontal plane, but the space between the two first protrusions on one side is larger than that between two first protrusions on the other side, and the grooves 9 are formed corresponding to the four first protrusions 8, and therefore the upper cover 2 can move over the first protrusions 8 to be placed on a lower part of the rectangular tray body 1; and after the upper cover 2 is horizontally rotated by 180°, the grooves 9 can still be staggered with the first protrusions 8, and then the upper cover 2 can be placed on the first protrusions 8.

In the Embodiment 1, the Embodiment 2, the Embodiment 3 and the Embodiment 4, the first protrusions 8 and third protrusions 19 are bumps opposite to the inner chamber of the tray body 1, and the second protrusion 10 is a step opposite to the inner chamber of the tray body 1 and circumferentially arranged at the bottom part of the side wall of the tray body 1.

The tray body 1, the upper cover 2 and the outer cover 11 are made of metal materials, so the outer edge of the upper cover 2 is the protective casing 3 which wraps the side edge of the upper cover 2; and at least one of the pot edge 6 or the cover edge 14 is wrapped with the insulation protection ring 15 to avoid fire striking caused by contact of the upper cover 2 and the tray body 1 and contact of the outer cover 11 and the tray body 1. In the Embodiment 1, the Embodiment 2, the Embodiment 3 and the Embodiment 4, the insulations protection ring 15 wrap the pot edge 6. The protective casing 3 and the insulation protection ring 15 are made of nonmetal insulating materials, preferably silicone rubber and plastics.

What is claimed is:

1. A multifunctional microwave baking tray, comprising a tray body, an upper cover and a microwave absorbing layer, wherein an outer edge of the upper cover is wrapped with a protective casing; the outer edge of the upper cover has an axisymmetric outline having at least two symmetric axes; first protrusions are arranged on a side wall of an inner chamber of the tray body; the outer edge of the upper cover is provided with grooves matched with the first protrusions; when the grooves are aligned with the first protrusions, the grooves move over the first protrusions to enable the upper cover to freely enter the inner chamber of the tray body; and when the grooves are staggered with the first protrusions, the upper cover is positioned above or below the first protrusions and cannot freely ascend and descend in the inner chamber of the tray body;

wherein a second protrusion is arranged at a bottom part of the side wall of the inner chamber of the tray body and is not matched with the grooves.

2. The multifunctional microwave baking tray according to claim 1, wherein the inner chamber of the tray body is round, and third protrusions are arranged on the side wall of the inner chamber of the tray body between the first protrusions and the second protrusion.

3. The multifunctional microwave baking tray according to claim 2, wherein the first protrusions and the third protrusions are bumps, and the second protrusion is at least one of a step and a bump.

4. The multifunctional microwave baking tray according to claim 2, further comprising an outer cover, wherein an outer edge of the outer cover is provided with a cover edge; a top end of the side wall of the tray body extends outwards to form a pot edge; and an insulation protection ring is arranged between the cover edge and the pot edge and located on the pot edge and the cover edge.

5. The multifunctional microwave baking tray according to claim 2, further comprising an outer cover, wherein an outer edge of the outer cover is provided with a cover edge; a top end of the side wall of the tray body extends outwards to form a pot edge; and an insulation protection ring is arranged between the cover edge and the pot edge and located on the pot edge.

6. The multifunctional microwave baking tray according to claim 2, further comprising an outer cover, wherein an outer edge of the outer cover is provided with a cover edge; a top end of the side wall of the tray body extends outwards to form a pot edge; and an insulation protection ring is arranged between the cover edge and the pot edge and located on the cover edge.

7. The multifunctional microwave baking tray according to claim 1, further comprising an outer cover, wherein the outer edge of the outer cover is provided with a cover edge; a top end of the side wall of the tray body extends outwards to form a pot edge; and an insulation protection ring is arranged between the cover edge and the pot edge and located on the pot edge and the cover edge.

8. The multifunctional microwave baking tray according to claim 7, wherein the tray body, the upper cover and the outer cover are all made of metal materials.

9. The multifunctional microwave baking tray according to claim 1, further comprising an outer cover, wherein the outer edge of the outer cover is provided with a cover edge; a top end of the side wall of the tray body extends outwards to form a pot edge; and an insulation protection ring is arranged between the cover edge and the pot edge and located on the pot edge.

10. The multifunctional microwave baking tray according to claim 9, wherein the tray body, the upper cover and the outer cover are all made of metal materials.

11. The multifunctional microwave baking tray according to claim 1, further comprising an outer cover, wherein the outer edge of the outer cover is provided with a cover edge; a top end of the side wall of the tray body extends outwards to form a pot edge; and an insulation protection ring is arranged between the cover edge and the pot edge and located on the cover edge.

12. The multifunctional microwave baking tray according to claim 11, wherein the tray body, the upper cover and the outer cover are all made of metal materials.

13. The multifunctional microwave baking tray according to claim 1, wherein outer surfaces of the tray body and the upper cover are provided with the microwave absorption layers.

* * * * *